Feb. 3, 1948.   J. TUTTLE   2,435,480
EXPANDABLE WORK PIECE HOLDER
Filed March 15, 1945   2 Sheets-Sheet 1
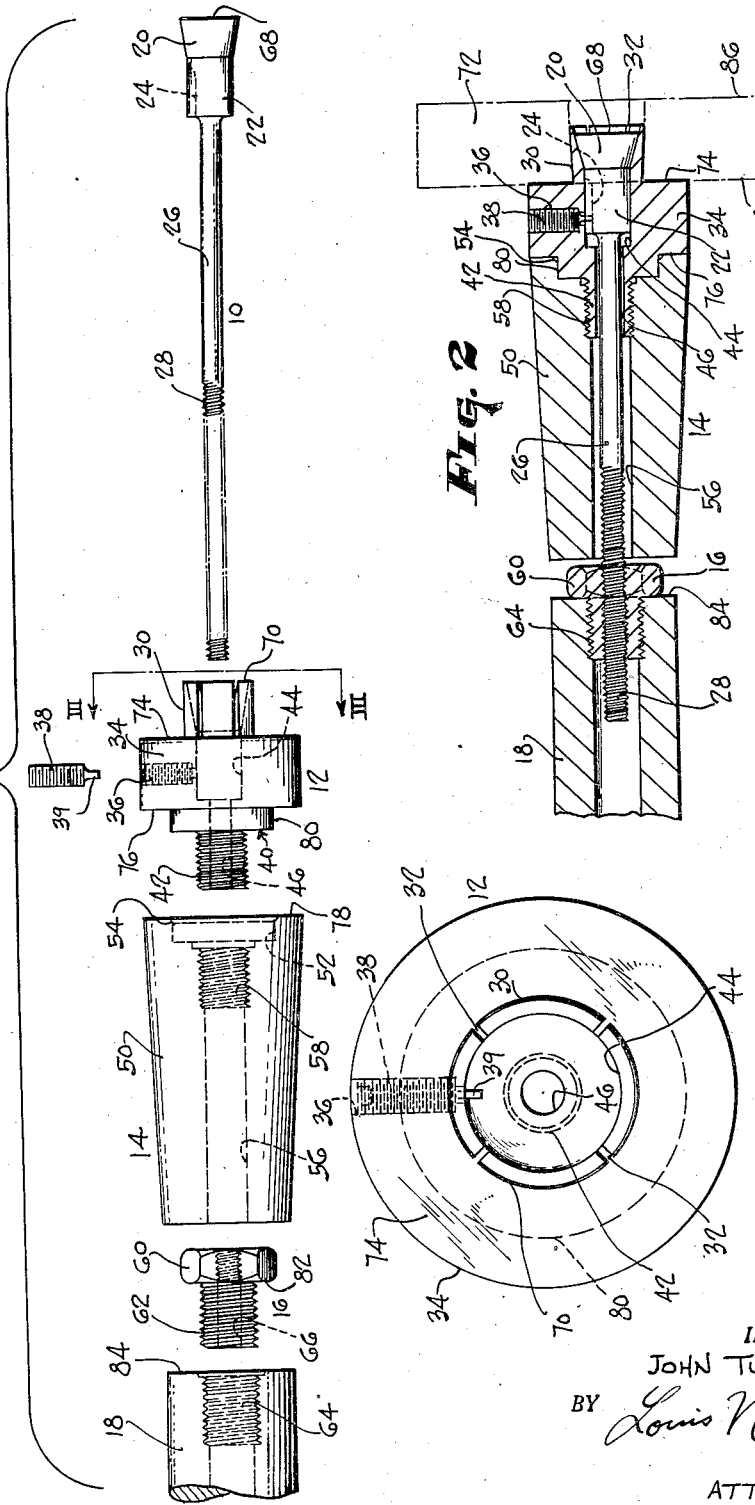
INVENTOR.
JOHN TUTTLE
BY Louis Nechs
ATTORNEY.

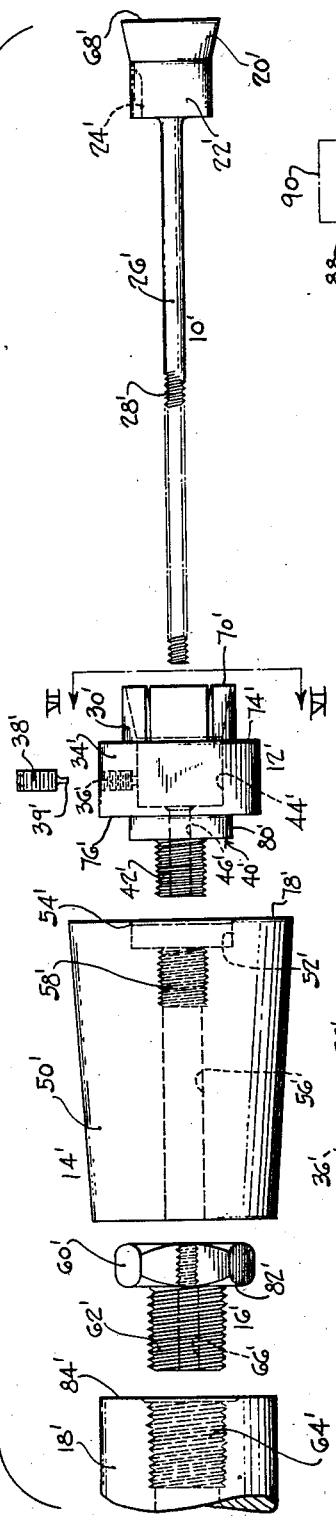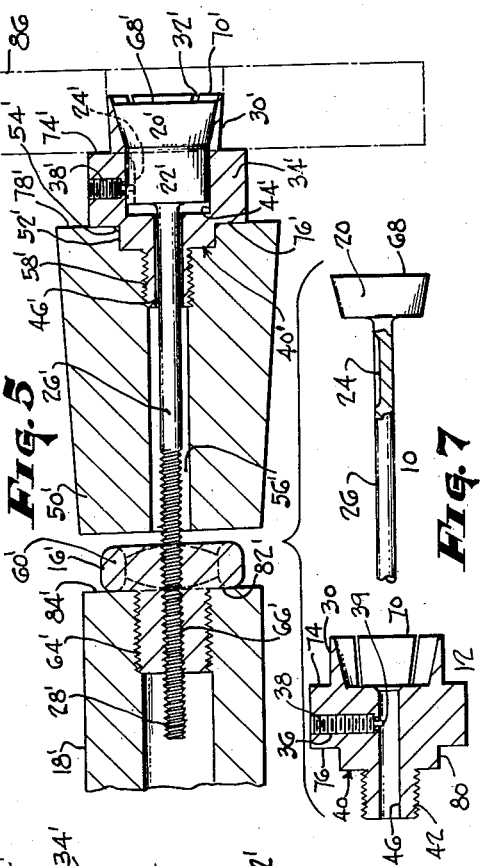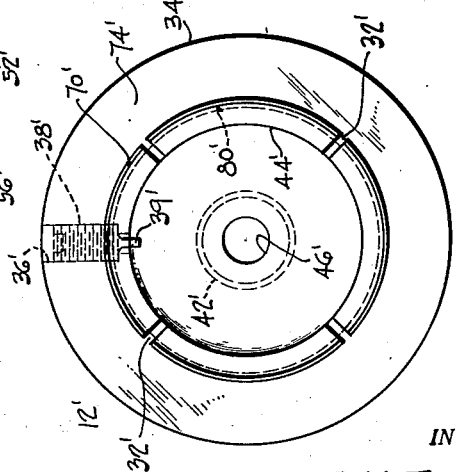

Patented Feb. 3, 1948

2,435,480

UNITED STATES PATENT OFFICE 2,435,480

EXPANDIBLE WORKPIECE HOLDER

John Tuttle, Bala-Cynwyd, Pa.

Application March 15, 1945, Serial No. 582,953

3 Claims. (Cl. 279—2)

My invention relates to an expandible work piece holder of the type disclosed in Osborn Patent No. 1,293,525 of February 4, 1919, one object of this invention being to produce an improved expandible work piece holder of this type.

A work piece holder of the type referred to includes, mainly, an expandible member adapted to engage an opening in the work piece, and an expander member having a tapered head adapted to expand said expandible member into tight engagement with the wall of said opening, to hold said work piece firmly while it is being presented to a cutting or grinding tool.

A device of this character, to be fully practical and useful, should be adapted automatically to align the work piece so as to present it accurately to the cutting tool; should make it possible to remove a finished piece of work and to mount a new piece without stopping the machine; and, finally and very important, a device like this should be adapted for use in connection with work pieces of different sizes, or in connection with machines of different sizes, without the necessity of having to manufacture complete different sets of parts for each size of work piece or each size of machine.

It is, therefore, a further object of the invention to produce an improved work piece holder which accomplishes the above objects economically and in a practical manner.

These and other objects are effected by the invention as will be apparent from the following description and claims taken in connection with the accompanying drawings forming a part of this application, in which:

Fig. 1 is an exploded, side elevational view of an expandible work piece holder embodying my invention;

Fig. 2 is a longitudinal vertical sectional view of the device of Fig. 1, shown assembled;

Fig. 3 is an enlarged elevational view looking in the direction of the line 3—3 in Fig. 1;

Fig. 4 is a view, similar to Fig. 1, illustrating the adaptation of the device for use in connection with a larger machine and a larger size work piece;

Fig. 5 is a longitudinal, vertical sectional view of the device of Fig. 4, shown assembled;

Fig. 6 is an enlarged elevational view, looking in the direction of line 6—6 on Fig. 4; and Fig. 7 is a fragmentary, exploded view showing a slightly modified form of construction.

As shown in Figs. 1 to 3, the work piece holder includes an elongated expander member 10, an adapter collet 12, an adapter sleeve 14 and an adapter nut 16. 18 designates the end of a conventinal draw bar of a conventional lathe which is adapted to engage and operate the usual chuck of a lathe, and which is adapted to be moved to the right and to the left, as shown in the drawings, by means of conventional operating mechanism forming part of a lathe. Since the draw bar and its operating mechanism are conventional, they are not shown in detail.

The expander member 10 includes a tapered head 20, a cylindrical portion 22, having a slot 24 therein, and shank 26, a portion 28 of which is threaded.

The adapter collet 12 includes an expandible tapered sleeve or bushing 30, having slots 32 and adapted to receive the tapered head 20 of the expander, a large cylindrical portion 34 having a tapped hole 36 for receiving a threaded screw 38, a reduced cylindrical portion 40 and a threaded nipple 42. The screw 38 is provided with a guide pin 39 adapted to engage the slot 24 in the cylindrical portion 22 of the expander member. The collet 12 is preferably made in one piece and is internally bored to provide a large cylindrical bore 44 for receiving the cylindrical portion 22 of the expander member 10, and a small cylindrical bore 46 through which the shank 26 of the expander is adapted to pass.

The adapter sleeve 14 includes an exteriorly tapered body 50 which is adapted to be engaged by the head stock of the lathe, not shown. The adapter sleeve 14 is counterbored to form a seat 52 for engaging the reduced portion 40 of the collet, the outer end of the seat 52 being relieved, as at 54. The adapter sleeve 14 is also provided with an internal bore 56 through which the shank 26 of the expander member is adapted to pass, a portion 58 of the adapter sleeve being threaded for engaging the nipple 42 of the collet 12.

The adapter nut 16 includes a head 60 and a threaded nipple 62 adapted to engage a threaded bore 64 in the end of the draw bar 18. The nut 16 is provided with an internal threaded bore 66 adapted to be engaged by the threaded portion 28 of the expander 10.

Assembly

The collet 12 is threaded to the adapter sleeve 14, the nut 16 is threaded to the end of the draw bar 18, the shank 26 of the expander member is passed through the collet and adapter sleeve, and the threaded portion 28 thereof is threaded into the bore 66 of the nut 16, care being taken to see that the guide pin 39 of the screw 38 engages the slot 24 in the cylindrical portion 24 of the expander member. It will be understood that the length of the slot 24 is slightly greater than the length of the stroke of the draw bar so as to permit free longitudinal movement of the expander member while preventing free rotation of the collet relative to the expander member. It will also be understood that the tapered adapter sleeve 14 is engaged by the head stock of the lathe and that the entire assembly is rotated as a unit. In threading the expander shank 26 to the nut, care is taken to adjust the parts so that when the draw bar is moved to the right, or releasing position, the outer face 68 of the tapered expander head will be in the vertical plane of the outer edge 70 of the slotted bushing 30. By this means, movement of the draw bar to the left, will move the expander head inwardly, as shown in Fig. 2, to expand the bushing 30 outwardly against the internal bore of a piece of work 72, shown in broken lines in Fig. 2.

According to my invention, the opposite, vertical, flat faces 74 and 76 of the collet, the vertical face 78 of the adapter sleeve, the surface 80 of the reduced cylindrical portion 40 and the seat 52, are all so machined that, when the collet and the adapter sleeve are assembled, the vertical faces will be normal to, and the cylindrical surfaces will be concentric with, the axis of rotation. Likewise, and for the same reason, the abutting faces 82 and 84 of the nut 16 and draw bar 18, respectively, are normal to, and the threaded nipple 62, the threaded bore 64 and the threaded bore 66 are concentric with, the axis of rotation. It will be noted that relieving the counterbore of the adapter sleeve, as at 54, insures proper engagement between the flat vertical faces 76 and 78 and the cylindrical surfaces 80 and 52.

*Operation*

With the device assembled as described, and with the draw bar in its releasing position (to the right in Figs. 1 and 2), the work piece 72 is slipped onto the slotted bushing 30. The draw bar is moved to its tightening position (to the left in Figs. 1 and 2) to draw the tapered expander head 20 inwardly, thus expanding the bushing 30 to hold the work piece in position. This, according to a full size working machine now in use in mass production, is done while the lathe is in operation, and the work holder is rotating at high speed. The cutting tool is now advanced against the work piece for performing the desired operation, that is, turning the periphery or facing the outer vertical side 86 of the work piece. When this operation is completed, the draw bar is moved to releasing position in which the tapered head is moved to the right of the position shown in Fig. 2. The work piece may now be removed, while the parts are rotating, and turned around so as to abut the trued surface 86 thereof against the trued surface 74 of the collet, and to present the other face 88 thereof to the cutting tool for facing, etc. Since the faces 74, 76 and 78 are parallel and the surfaces 52 and 80 are concentric, the face 88 of the work piece will be machined perfectly parallel to the face 86 thereof, and the periphery 90 of the work piece will be machined perfectly concentric with the axis of rotation.

It will thus be seen that by providing the adapter collet, the adapter sleeve and adapter nut, and by making their respective coacting flat faces parallel and their respective cylindrical surfaces concentric with the axis of rotation, the work piece is automatically centered and held with its vertical faces normal to the axis of rotation without the usual centering devices, and without the work piece being held between centers, thus permitting complete turning of the periphery and facing of one complete face, in one operation. Also, I have found that by using the device described, instead of holding the work piece by means of the conventional lathe chuck, production is increased five fold. This is due to the fact that the work piece can be removed, turned around and again mounted by moving the draw bar with one hand and rearranging the work piece with the other hand, almost instantaneously, while the machine is running and without any attention to any other parts, until the job lot for which the set-up had been made is completed.

My invention further contemplates adapting the device described for use in connection with a work piece having a larger (or smaller) internal bore and with a lathe having larger (or smaller) head stock and draw bar, with minimum change in the parts so as to reduce the incidental expense.

As shown in Figs. 4 to 6, the collet 12' is identical with that shown in Fig. 1, except that the slotted bushing 30' and the bore 44' are made larger. Likewise, the expander 10' of Fig. 4 is identical with that shown in Fig. 1, except that the head 20' thereof is made larger. The same is true of the adapter sleeve 14' which, except for having a larger tapered body portion 50', may be identical with that shown in Fig. 1, and of the nut 16 which, except for the larger head 60' and the larger nipple 62', for engaging a larger draw bar 18' having a larger bore 64', are identical with those shown in Fig. 1. The cylindrical portion 22' and the bore 44' may be the same size as the portion 22 and bore 44, or may be enlarged, as shown in Figs. 4 to 6. By this arrangement, the shank 26 of the expander, all of the remaining parts of the collet, the seat 52, the threaded bore 58 of the adapter sleeve, and the bore 66 of the adapter nut remain the same. These parts, therefore, can be made in quantity with the same tools and the same respective set-ups, thus reducing the cost of manufacture. Since, except as pointed out, the parts shown in Figs. 4 to 6 are identical with those shown in Figs. 1 to 4, they have been referred to with the reference numerals corresponding to those used in connection with Figs. 1 to 4.

In Fig. 7, I have shown a modified form of construction in which the cylindrical portions 24 and 24' are omitted and in which the slot 24 or 24' is formed in the expander shank 26 or 26'.

What I claim is:

1. A work piece holder comprising an adapter collet, an expandible bushing extending from one side of said collet and adapted to engage an opening in a work piece, a hollow threaded nipple extending from the other side of said collet, an elongated member including a shank adapted to extend through said bushing, said collet and said nipple, and a tapered head adapted to move into and expand said bushing to lock the same to said work piece, an adapter sleeve adapted to be engaged by the rotating head stock of a machine tool and having a passage therein through which said shank extends, a portion of the passage in said sleeve being threaded for engaging said nipple, and means engaging the end of said shank opposite said tapered head and operable to force said tapered head into and out of said bushing.

2. The structure recited in claim 1 in which the face of said sleeve adjacent said collet and the opposite sides of said collet are normal to the axis of rotation of said head stock.

3. A work piece holder comprising an adapter collet having opposite sides, an expandible bushing extending from one side of said collet and adapted to engage an opening in a work piece, a reduced portion extending from the other side of said collet, a threaded nipple extending from the side of said reduced portion, an elongated member including a shank adapted to extend through said bushing, said collet, said reduced portion, and said nipple, and a tapered head adapted to move into and expand said bushing to lock the same to said work piece, an end portion of said shank being threaded, an adapter sleeve adapted to be engaged by the rotating head stock of a machine tool and having a passage therein through which said shank extends, the face of the end of said sleeve adjacent said collet, and the side walls of said collet, being normal to the axis of rotation of the work piece, a portion of the passage in said sleeve being threaded for engaging said nipple, there being a counterbored recess in the end of said sleeve adjacent said collet for engaging said reduced portion, and an adapter nut threadedly engaging the threaded portion of said shank, and adapted to engage the draw bar of said machine tool, to force said tapered head into and out of said bushing with the movement of said draw bar.

JOHN TUTTLE.

REFERENCES CITED

The following references are of record in the file of this patent:

UNITED STATES PATENTS

| Number | Name | Date |
| --- | --- | --- |
| 599,275 | Webb | Feb. 15, 1898 |
| 1,074,280 | Miller | Sept. 30, 1913 |
| 1,231,262 | Katchmazenski | June 26, 1917 |
| 2,213,379 | Bird et al. | Sept. 3, 1940 |
| 2,348,819 | Johnson | May 16, 1944 |

OTHER REFERENCES

Publication, Tool Engineering, American Machinist, Dec. 8, 1921, Bol. 55, No. 23, pages 915 through 918.